United States Patent
Price, Jr. et al.

(10) Patent No.: US 6,345,853 B1
(45) Date of Patent: Feb. 12, 2002

(54) SELF-SUPPORTING, CONFINED SPACE ENTRY MOBILE UNIT

(76) Inventors: William A. Price, Jr., P.O. Box 30425, Clarksville, TN (US) 37040; John L. Sullivan, 2701 Trelawny Dr., Clarksville, TN (US) 37043; Timothy R. Wanke, P.O. Box 1606, Cadiz, KY (US) 42211

( * ) Notice: Subject to any disclaimer, the term of this patent is extended or adjusted under 35 U.S.C. 154(b) by 0 days.

(21) Appl. No.: 09/648,239

(22) Filed: Aug. 25, 2000

(51) Int. Cl.$^7$ .............................................. B62D 33/02
(52) U.S. Cl. ..................................... 296/24.1; 296/182
(58) Field of Search .............................. 296/24.1, 37.6, 296/181, 182

(56) References Cited

U.S. PATENT DOCUMENTS

| | | | |
|---|---|---|---|
| 2,811,111 A | | 10/1957 | Levitz et al. |
| 2,934,229 A | * | 4/1960 | Worden ...................... 414/484 |
| 3,734,540 A | | 5/1973 | Thiermann |
| 3,810,487 A | * | 5/1974 | Cable et al. ........... 296/24.1 X |
| 4,055,206 A | | 10/1977 | Griffin |
| 4,133,572 A | * | 1/1979 | Robbins et al. ............. 296/168 |
| 4,160,806 A | * | 7/1979 | Long et al. ................. 422/223 |
| D267,800 S | | 2/1983 | Tate |
| 4,516,308 A | * | 5/1985 | Urban .......................... 29/564 |
| 4,847,928 A | * | 7/1989 | Fey ....................... 296/37.6 X |
| 4,858,256 A | * | 8/1989 | Shankman ............. 296/24.1 X |
| 5,214,047 A | * | 5/1993 | Ostersehit ................... 514/257 |
| 5,362,013 A | * | 11/1994 | Aulson ................... 296/24.1 X |
| 5,383,698 A | * | 1/1995 | Buchholz ................... 296/24.1 |
| 5,396,885 A | | 3/1995 | Nelson |
| 5,873,919 A | | 2/1999 | Vross et al. |
| 6,039,377 A | * | 3/2000 | Eberspacher ............... 296/24.1 |
| 6,179,358 B1 | * | 1/2001 | Hirayama et al. .......... 296/24.1 |

FOREIGN PATENT DOCUMENTS

| | | | | |
|---|---|---|---|---|
| DE | | 3441395 A1 | * 5/1986 | ................. 296/24.1 |
| WO | WO-87/07665-a1 | | * 12/1987 | ................. 296/24.1 |

* cited by examiner

*Primary Examiner*—Joseph D. Pape
*Assistant Examiner*—Patricia L. Engle

(57) ABSTRACT

A self-supporting, confined space entry mobile unit for supplying the necessary equipment for permit-required confined space entries. The self-supporting, confined space entry mobile unit includes a trailer assembly having a frame, a flat bed having a front, back, and sides and being securely mounted upon the frame, wheeled axles upon which the frame is securely mounted, a tongue securely attached to and extending forward of the frame, and a hitch connecting member securely attached to the tongue for hitching to a prime mover; and also including an air evacuation assembly including an air evacuation unit securely mounted upon the flat bed; and further including an air supply assembly contained upon the flat bed for providing breathable air to users; and also including a storage assembly securely mounted upon the flat bed; and further including emergency use equipment including a fire extinguisher and a carbon monoxide detector being stored in the storage assembly; and also including a light-emitting assembly disposed upon the flat bed.

16 Claims, 3 Drawing Sheets

SELF-SUPPORTING, CONFINED SPACE ENTRY MOBILE UNIT

BACKGROUND OF THE INVENTION

1. Field of the Invention

The present invention relates to a self-contained emergency use mobile unit and more particularly pertains to a new self-supporting, confined space entry mobile unit for supplying the necessary equipment for permit-required confined space entries.

2. Description of the Prior Art

The use of a self-contained emergency use mobile unit is known in the prior art. More specifically, a self-contained emergency use mobile unit heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,516,308; U.S. Pat. No. 5,383,698; U.S. Pat. No. 4,160,806; U.S. Pat. No. 4,133,572; U.S. Pat. No. 5,214,047; and U.S. Pat. No. 2,934,229.

While these devices fulfill their respective, particular objectives and requirements, the aforementioned patents do not disclose a new self-supporting, confined space entry mobile unit. The inventive device includes a trailer assembly having a frame, a flat bed having a front back, and sides and being securely mounted upon the frame, wheeled axles upon which the frame is securely mounted, a tongue securely attached to and extending forward of the frame, and a hitch connecting member securely attached to the tongue for hitching to a prime mover; and also including an air evacuation assembly including an air evacuation unit securely mounted upon the flat bed; and further including an air supply assembly contained upon the flat bed for providing breathable air to users; and also including a storage assembly securely mounted upon the flat bed; and further including emergency use equipment including a fire extinguisher and a carbon monoxide detector being stored in the storage assembly, and also including a light-emitting assembly disposed upon the flat bed.

In these respects, the self-supporting, confined space entry mobile unit according to the present invention substantially departs from the conventional concepts and designs of the prior art, and in so doing provides an apparatus primarily developed for the purpose of supplying the necessary equipment for permit-required confined space entries.

SUMMARY OF THE INVENTION

In view of the foregoing disadvantages inherent in the known types of self-contained emergency use mobile unit now present in the prior art, the present invention provides a new self-supporting, confined space entry mobile unit construction wherein the same can be utilized for supplying the necessary equipment for permit-required confined space entries.

The general purpose of the present invention, which will be described subsequently in greater detail, is to provide a new self-supporting, confined space entry mobile unit which has many of the advantages of the self-contained emergency use mobile unit mentioned heretofore and many novel features that result in a new self-supporting, confined space entry mobile unit which is not anticipated, rendered obvious, suggested, or even implied by any of the prior art self-contained emergency use mobile unit, either alone or in any combination thereof.

To attain this, the present invention generally comprises a trailer assembly having a frame, a flat bed having a front, back, and sides and being securely mounted upon the frame, wheeled axles upon which the frame is securely mounted, a tongue securely attached to and extending forward of the frame, and a hitch connecting member securely attached to the tongue for hitching to a prime mover; and also including an air evacuation assembly including an air evacuation unit securely mounted upon the flat bed; and further including an air supply assembly contained upon the flat bed for providing breathable air to users; and also including a storage assembly securely mounted upon the flat bed; and further including emergency use equipment including a fire extinguisher and a carbon monoxide detector being stored in the storage assembly; and also including a light-emitting assembly disposed upon the flat bed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new self-supporting, confined space entry mobile unit which has many of the advantages of the self-contained emergency use mobile unit mentioned heretofore and many novel features that result in a new self-supporting, confined space entry mobile unit which is not anticipated, rendered obvious, suggested, or even implied by any of the prior art self-contained emergency use mobile unit, either alone or in any combination thereof.

It is another object of the present invention to provide a new self-supporting, confined space entry mobile unit which may be easily and efficiently manufactured and marketed.

It is a further object of the present invention to provide a new self-supporting, confined space entry mobile unit which is of a durable and reliable construction.

An even further object of the present invention is to provide a new self-supporting, confined space entry mobile unit which is susceptible of a low cost of manufacture with regard to both materials and labor, and which accordingly is then susceptible of low prices of sale to the consuming public, thereby making such self-supporting,, confined space entry mobile unit economically available to the buying public.

Still yet another object of the present invention is to provide a new self-supporting, confined space entry mobile unit which provides in the apparatuses and methods of the prior art some of the advantages thereof, while simultaneously overcoming some of the disadvantages normally associated therewith.

Still another object of the present invention is to provide a new self-supporting, confined space entry mobile unit for supplying the necessary equipment for permit-required confined space entries.

Yet another object of the present invention is to provide a new self-supporting, confined space entry mobile unit which includes a trailer assembly having a frame, a flat bed having a front, back, and sides and being securely mounted upon the frame, wheeled axles upon which the frame is securely mounted, a tongue securely attached to and extending forward of the frame, and a hitch connecting member securely attached to the tongue for hitching to a prime mover; and also including an air evacuation assembly including an air evacuation unit securely mounted upon the flat bed; and further including an air supply assembly contained upon the flat bed for providing breathable air to users; and also including a storage assembly securely mounted upon the flat bed; and further including emergency use equipment including a fire extinguisher and a carbon monoxide detector being stored in the storage assembly; and also including a light-emitting assembly disposed upon the flat bed.

Still yet another object of the present invention is to provide a new self-supporting, confined space entry mobile unit that supplies all the equipment needed to do the job in an easily movable unit.

Even still another object of the present invention is to provide a new self-supporting, confined space entry mobile unit that effectively improves the overall safety for the users.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
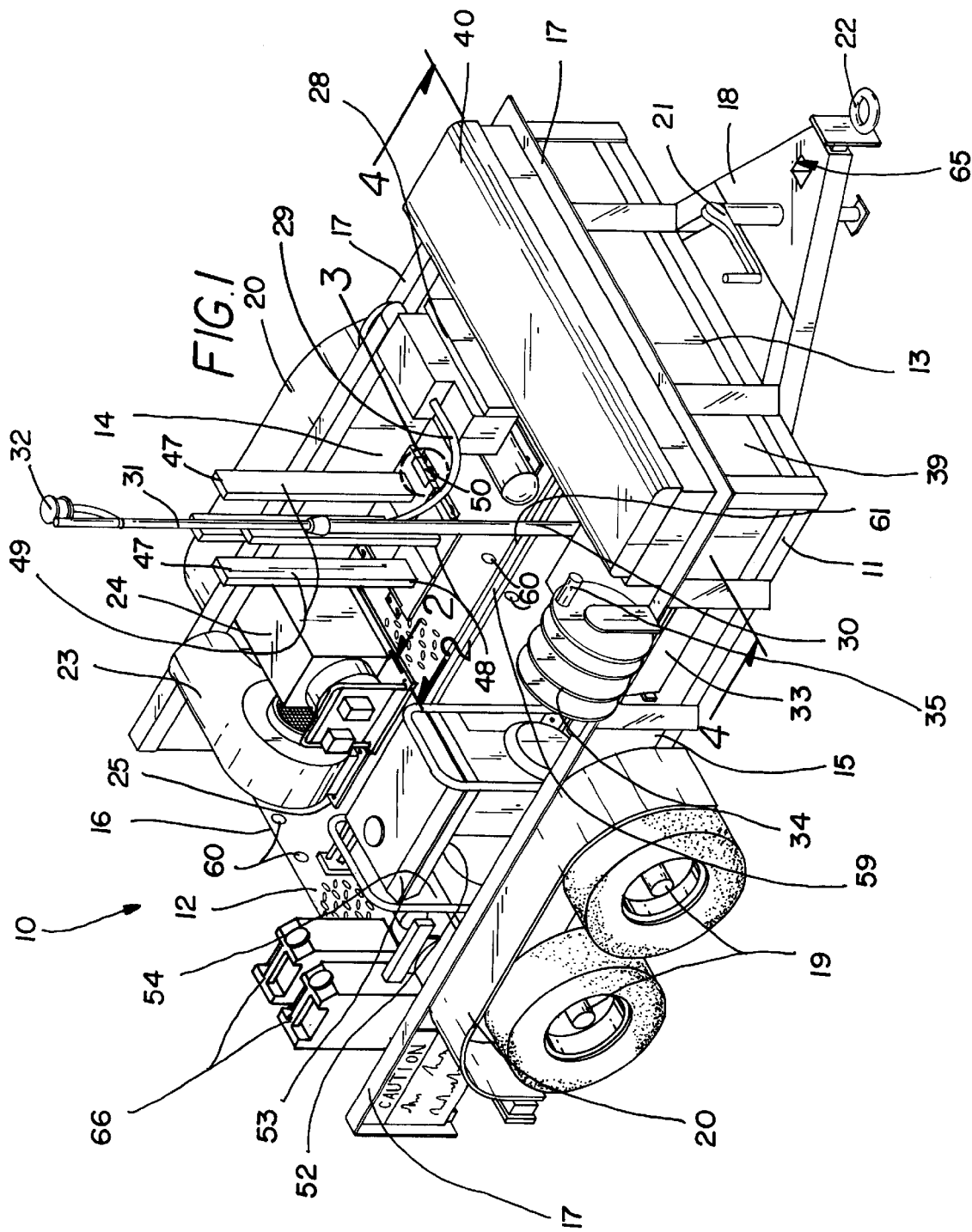
FIG. 1 is a perspective view of a new self-supporting, confined space entry mobile unit according to the present invention.
Figure 2:
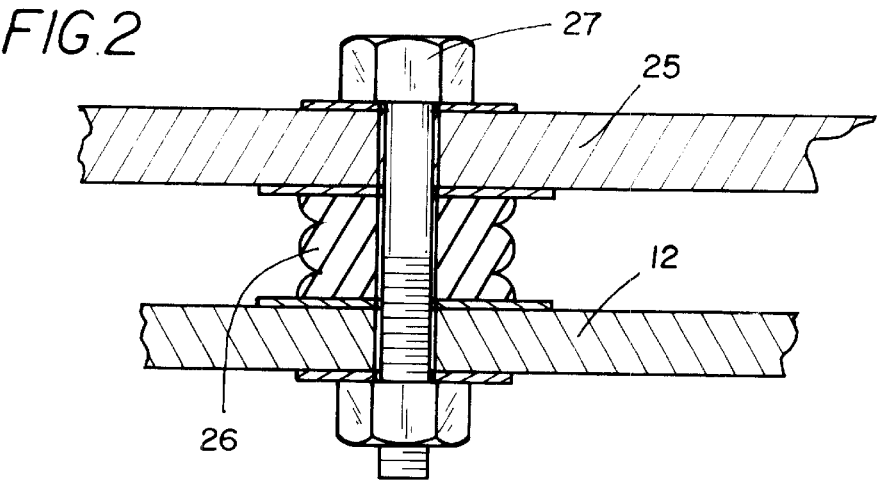
FIG. 2 is a detailed partial cross-sectional view of the flat bed and a support member for the air evacuation unit of the present invention.
Figure 3:
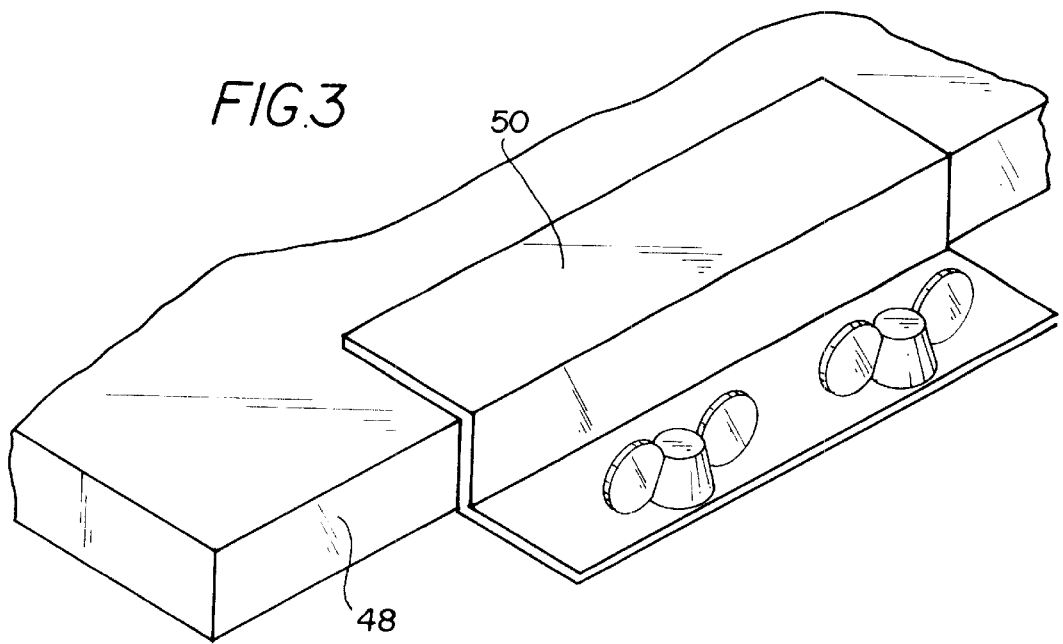
FIG. 3 is a perspective view of the base retaining member of the present invention.
Figure 4:
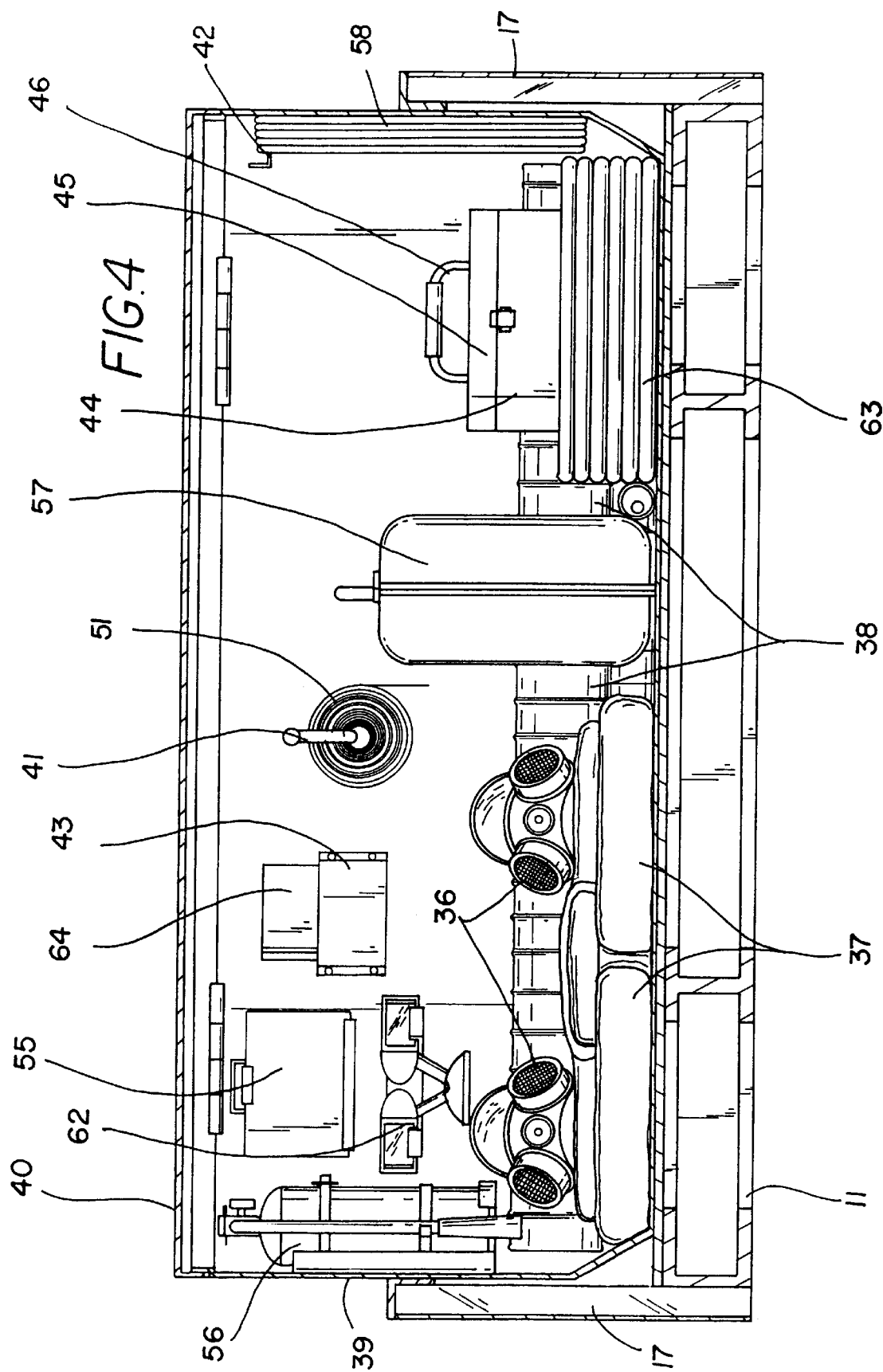
FIG. 4 is a cross-sectional view of the storage container of the present invention.

With reference now to the drawings, and in particular to FIGS. 1 through 4 thereof, a new self-supporting, confined space entry mobile unit embodying the principles and concepts of the present invention and generally designated by the reference numeral 10 will be described.

As best illustrated in FIGS. 1 through 4, the self-supporting, confined space entry mobile unit 10 generally comprises a trailer assembly having a frame 11. A flat bed 12 having a front 13, back 16 and left and right sides 14, 15 may be securely and conventionally mounted upon the frame 11. The frame 11 is securely and conventionally mounted upon wheeled axles 19, and a tongue 18 may be securely and conventionally attached to and may extend forward of the frame 11. A hitch connecting member 22 may be securely and conventionally attached to the tongue 18 for hitching to a prime mover. The trailer assembly also includes railings 17 securely and conventionally attached to and extending along the sides 14, 15 and the front 13 of the flat bed 12. The trailer assemnbly further includes a jack 21 conventionally attached to the tongue 18 for raising and lowering the tongue 18. The trailer assembly includes fenders 20 conventionally mounted to the frame 11 and being disposed over wheels of the wheeled axles 19. The flat bed 12 is essentially covered with diamond-shaped protusions. The tongue 18 may have a ball storage compartment 65 therein for storing a ball for a hitch. The hitch connecting member 22 may be a ring-like member.

An air evacuation assembly includes an air evacuation unit 23 and a generator unit 24 conventionally connected to the air evacuation unit 23 for the energizing of the air evacuation unit. The air evacuation unit 23 and the generator unit 24 may be securely and conventionally mounted upon the flat bed 12. The air evacuation assembly further includes a support member 25 fastened upon the flat bed 12 with fasteners 27. The support member may be adapted to support the air evacuation unit 23. Shock absorbing members 26 may be disposed between the support member 25 and the flat bed 12 for providing a smooth ride for the air evacuation unit 23. The support member 25 is essentially a plate-like member which is disposed near a left rear of the flat bed 12.

An air supply assembly is contained upon the flat bed 12 for providing breathable air to users. The air supply assembly includes an air pump 28 securely and conventionally mounted upon the flat bed 12 for providing breathable air to the users. The air supply assembly may include a tubular assembly having a tubular base member 30 securely and conventionally mounted upon the flat bed 12 and extending upwardly therefrom and being connected to the air generator 28 with a hose 29. The tubular assembly may have a tubular section 31 conventionally connected to and extendable from the tubular base member 30. The tubular assembly may have an air intake member 32 securely and conventionally disposed at a top end of the tubular section 31 for taking in air. The air supply assembly may include respirator masks 36, full body chemical suits 37, and air hoses 63 for the respirator masks 36 all stored in a storage assemble, and may also include an air filtration unit 33 securely and conventionally mounted upon the flat bed 12. The air filtration unit may be connected to the tubular assembly for filtering the breathable air, and may also include air hose reels 34 having handles 35 and being securely and conventionally mounted to one of the railings 17. The air filtration unit my also include air ducts 38 and connectors for the air hoses 63.

The storage assembly is securely mounted upon the flat bed 12. The storage assembly may include a storage container 39 being securely mounted upon the flat bed 12 at the front 13 thereof. The storage container may include a bottom wall, side and end walls, an open top. The storage container may include a lid 40 hingedly attached to one of the side walls and being closeable over the open top. The storage container may have a storage compartment therein. The storage assembly may include a tape hanger member 41 securely and conventionally attached to one of the side walls in the storage compartment of the storage container 39. The storage assembly may include a connector storage box 44 which is removably disposed in the storage compartment of the storage container 39 and which has a cover 45 and a handle 46 member. The storage assembly may include a cord hanger member 42 securely and conventionally attached to one of the end walls in the storage compartment of the storage container 39. The storage assembly may include a log book holder 43 securely and conventionally attached to one of the side walls in the storage compartment of the storage container 39.

Emergency use equipment includes a fire extinguisher 56 and a carbon monoxide detector 57 being stored in the storage assembly. The emergency use equipment may include rope off and warning poles 47 each having a base member 48 and an elongate member 49 securely mounted upon and extending upwardly from the base member 48. The base members 48 may be securely and removably mounted upon the flat bed 12 with base retaining members 50. The emergency use equipment may also include tape 51 removably supported upon the tape hanger member 41 and being adapted to attach to and extend between the rope off and warning poles 47 for providing a secured barrier. The emergency use equipment may further include a gasoline-operated generator 52 having a gasoline tank 53 and being securely and conventionally mounted upon the flat bed 12. The emergency use equipment may also include a backup generator 54 being securely and conventionally mounted upon the flat bed 12 near the gasoline-operated generator 52. The emergency use equipment further includes gasoline containers 66 securely and removably mounted upon the flat bed 12 for providing gasoline to the generators. The emergency use equipment may also include an electrical extension cord 58 removably stored upon the cord hanger member 42, and may further include a first aid kit 55 securely disposed in the storage container 39. The emergency use equipment may also include a log book 64 removably disposed in the log book holder 43. Each base retaining member 50 is essentially an angled plate-like member having a first end portion being securely fastened to the flat bed 12 with fastening members, an intermediate portion angled relative to the first end portion, and a second end portion angled relative to the intermediate portion. The base retaining member is engaged upon a respective base member 48.

A light-emitting assembly is disposed upon the flat bed 12 and includes an elongate support base member 59 being supported upon the flat bed 12 with tie-down eyelets 60 and tie-downs 61. The light-emitting assembly may include light-emitting members 62 conventionally mounted to the elongate support base member 59 for illuminating an area about the trailer assembly. The elongate support base member 59 may comprise a tripod.

In use, the users move the mobile unit 10 into a confined space where work is to be done. For safety reasons, the users would energize the generators 24 for operating the air evacuation unit 23 and the air generator 28 so that the fumes are removed from the confined space and replaced with breathable air of which the user can breathe through the respirator masks 36. The light-emitting assembly allows the user to illuminate the confined space where the work is being done. All the equipment needed by the users is contained upon the mobile unit 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A self-supporting, confined space entry mobile unit comprising:
   a trailer assembly having a frame, a flat bed having a front, back, and left and right sides and being securely mounted upon said frame, wheeled axles upon which said frame is securely mounted, a tongue securely attached to and extending forward of said frame, and a hitch connecting member securely attached to said tongue for hitching to a prime mover;
   an air evacuation assembly including an air evacuation unit and a generator unit connected to said air evacuation unit for the energizing thereof, said air evacuation unit and said generator unit being mounted upon said flat bed;
   an air supply assembly contained upon said flat bed for providing breathable air to users;
   a storage assembly securely mounted upon said flat bed;
   emergency use equipment including a fire extinguisher and a carbon monoxide detector being stored in said storage assembly; and
   a light-emitting assembly disposed upon said flat bed;
   wherein said trailer assembly also includes railings securely attached to and extending along said sides and said front of said flat bed.

2. A self-supporting, confined space entry mobile unit as described in claim 1, wherein said trailer assembly further includes a jack attached to said tongue for raising and lowering said tongue.

3. A self-supporting. confined space entry mobile unit as described in claim 1, wherein said air evacuation assembly further includes a support member fastened upon said flat bed and being adapted to support said air evacuation unit, and also includes shock absorbing members disposed between said support member and said flat bed.

4. A self-supporting, confined space entry mobile unit as described in claim 1. wherein said air supply assembly includes an air pump mounted upon said flat bed for providing breathable air to the users, and also includes a tubular assembly having a tubular base member mounted upon said flat bed and extending upwardly therefrom and being connected to said air pump with a hose, and having a tubular section connected to and extendable from said tubular base member, and also having an air intake member disposed at a top end of said tubular section for taking in air, and further includes respirator masks, full body chemical suits, and air hoses for said respirator masks, and also includes an air filtration unit mounted upon said flat bed and being connected to said tubular assembly for filtering the breathable air, and also includes air hose reels having handles and being mounted to one of said railings.

5. A self-supporting. confined space entry mobile unit as described in claim 1, wherein said storage assembly includes a storage container being mounted upon said flat bed at said front thereof and having a bottom wall, side and end walls, an open top with a lid closeable over said open top, said storage container also having a storage compartment therein, and also includes a tape hanger member attached to one of said side walls in said storage compartment of said storage container, and further includes a connector storage box which is removably disposed in said storage compartment of said storage container and which has a cover and a handle member, and also includes a cord hanger member attached to one of said end walls in said storage compartment of said storage container.

6. A self-supporting, confined space entry mobile unit as described in claim 1, wherein said emergency use equipment includes rope off and warning poles each having a base member and an elongate member mounted upon and extending upwardly from said base member with said base members being removably mounted upon said flat bed with base retaining members, and also includes tape being removably supported upon said tape hanger member and being adapted to attach to and extend between said rope off and warning poles for providing a secured barrier, and further includes a gasoline-operated generator having a gasoline tank and being mounted upon said flat bed, and also includes a backup generator also mounted upon said flat bed, and further includes gasoline containers removably mounted upon said flat bed for providing gasoline to said generators, and also includes an electrical extension cord removably stored upon said cord hanger member.

7. A self-supporting, confined space entry mobile unit as described in claim 6, wherein each said base retaining member comprises an angled plate-like member having a first end portion being fastened to said flat bed with fastening members, and also having an intermediate portion which is angled relative to said first end portion, and further having a second end portion which is angled relative to said intermediate portion and which is engaged upon a respective said base member.

8. A self-supporting, confined space entry mobile unit as described in claim 1 wherein said light-emitting assembly includes an elongate support base member being supported upon said flat bed with tie-down eyelets and tie-downs, and also includes light-emitting members mounted to said elongate support base member for illuminating an area about said trailer assembly.

9. A self-supporting, confined space entry mobile unit as described in claim 8, wherein said elongate support base member comprises a tripod.

10. A self-supporting, confined space entry mobile unit as described in claim 1, wherein said tongue has a ball storage compartment therein for storing a ball for a hitch.

11. A self-supporting, confined space entry mobile unit as described in claim 1 wherein said hitch connecting member is essentially a ring-like member.

12. A self-supporting, confined space entry mobile unit as described in claim 1, wherein said air supply assembly includes an air pump mounted upon said flat bed for providing breathable air to the users, and also includes a tubular assembly having a tubular base member mounted upon said flat bed and extending upwardly therefrom and being fluidly connected to said air pump, said tubular assembly having a tubular section connected to and extendable from said tubular base member, and also having an air intake member disposed at a top end of said tubular section for taking in air at an elevated location above said trailer assembly.

13. A self-supporting, confined space entry mobile unit as described in claim 1, wherein said storage assembly includes a storage container being mounted upon said flat bed, said storage container also having a storage compartment therein, and also includes a tape hanger member attached to said storage container in said storage compartment, and further includes a connector storage box removably disposed in said storage compartment of said storage container, and also includes a cord hanger member attached to said storage container in said storage compartment.

14. A self-supporting, confined space entry mobile unit as described in claim 1, wherein said emergency use equipment includes rope off and warning poles each having a base member and an elongate member mounted upon and extending upwardly from said base member with said base members being removably mounted upon said flat bed with base retaining members, and also includes tape being removably supported upon said tape hanger member and being adapted to attach to and extend between said rope off and warning poles for providing a secured barrier.

15. A self-supporting, confined space entry mobile unit as described in claim 14, A wherein each said base retaining member comprises an angled plate-like member having a first end portion being fastened to said flat bed with fastening members, and also having an intermediate portion which is angled relative to said first end portion, and further having a second end portion which is angled relative to said intermediate portion and which is engaged upon a respective said base member.

16. A self-supporting, confined space entry mobile unit comprising:

a trailer assembly having a frame, a flat bed having a front, back, and left and right sides and being securely mounted upon said frame, wheeled axles upon which said frame is securely mounted, a tongue securely attached to and extending forward of said frame, and a hitch connecting member securely attached to said tongue for hitching to a prime mover, said trailer assembly also including railings securely attached to and extending along said sides and said front of said flat bed, said trailer assembly further including a jack attached to said tongue for raising and lowering said tongue, and also including fenders mounted to said frame and being disposed over wheels of said wheeled axles, said tongue having a ball storage compartment therein for storing a ball for a hitch, said hitch connecting member being essentially a ring-like member;

an air evacuation assembly including an air evacuation unit and a generator unit connected to said air evacuation unit for the energizing thereof, said air evacuation unit and said generator unit being securely mounted upon said flat bed, said air evacuation assembly further including a support member fastened upon said flat bed with fasteners and being adapted to support said air evacuation unit, and also including shock absorbing members disposed between said support member and said flat bed for providing a smooth ride for said air evacuation unit, said support member being essentially a plate-like member which is disposed near a left rear of said flat bed;

an air supply assembly contained upon said flat bed for providing breathable air to users, said air supply assembly including an air generator securely mounted upon said flat bed for providing breathable air to the users, and also including a tubular assembly having a tubular base member securely mounted upon said flat bed and extending upwardly therefrom and being connected to said air generator with a hose, and having a tubular section connected to and extendable from said tubular base member, and also having an air intake member securely disposed at a top end of said tubular section for taking in air, and further including respirator masks, full body chemical suits, and air hoses for said respirator masks all stored in said storage assembly, and also including an air filtration unit securely mounted upon said flat bed and being connected to said tubular assembly for filtering the breathable air, and also including air hose reels having handles and being securely mounted to one of said railings, and further including air ducts and connectors for said air hoses;

a storage assembly securely mounted upon said flat bed, said storage assembly including a storage container being securely mounted upon said flat bed at said front thereof and having a bottom wall, side and end walls, an open top with a lid hingedly attached to one of said side walls and being closeable over said open top, said storage container also having a storage compartment therein, and also including a tape hanger member securely attached to one of said side walls in said storage compartment of said storage container, and further including a connector storage box which is removably disposed in said storage compartment of said storage container and which has a cover and a handle member, and also including a cord hanger member securely attached to one of said end walls in said storage compartment of said storage container;

emergency use equipment including a fire extinguisher and a carbon monoxide detector being stored in said storage assembly, said emergency use equipment including rope off and warning poles each having a base member and an elongate member securely mounted upon and extending upwardly from said base member with said base members being securely and removably mounted upon said flat bed with base retaining members, and also including tape being removably supported upon said tape hanger member and being adapted to attach to and extend between said rope off and warning poles for providing a secured barrier, and further including a gasoline-operated generator having a gasoline tank and being securely mounted upon said flat bed, and also including a backup generator also securely mounted upon said flat bed near said gasoline-operated generator, and further including gasoline containers securely and removably mounted upon said flat bed for providing gasoline to said generators, and also including an electrical extension cord removably stored upon said cord hanger member, and further including a first aid kit securely disposed in said storage container, each said base retaining member being essentially an angled plate-like member having a first end portion being securely fastened to said flat bed with fastening members, and also having an intermediate portion which is angled relative to said first end portion, and further having a second end portion which is angled relative to said intermediate portion and which is engaged upon a respective said base member; and a light-emitting assembly disposed upon said flat bed, said light-emitting assembly including an elongate support base member being supported upon said flat bed with tie-down eyelets and tie-downs, and also including light-emitting members mounted to said elongate support base member for illuminating an area about said trailer assembly, said elongate support base member being essentially a tripod.

* * * * *